(12) United States Patent
Gudbjartsson et al.

(10) Patent No.: US 7,381,909 B2
(45) Date of Patent: Jun. 3, 2008

(54) SHELVING SYSTEM FOR USE WITH LOAD CELL

(75) Inventors: Larus H. Gudbjartsson, Reykjavik (IS); Halfdan Ingolfsson, Akranes (IS)

(73) Assignee: Inventrol LLC, Hanover, NH (US)

( * ) Notice: Subject to any disclaimer, the term of this patent is extended or adjusted under 35 U.S.C. 154(b) by 0 days.

(21) Appl. No.: 11/695,695

(22) Filed: Apr. 3, 2007

(65) Prior Publication Data

US 2007/0227784 A1 Oct. 4, 2007

Related U.S. Application Data

(60) Provisional application No. 60/744,222, filed on Apr. 4, 2006.

(51) Int. Cl.
*G01G 21/10* (2006.01)
(52) U.S. Cl. .................. 177/25.13; 177/238; 177/255; 235/383; 700/214
(58) Field of Classification Search ............. 177/25.15, 177/238, 255; 235/383; 700/214
See application file for complete search history.

(56) References Cited

U.S. PATENT DOCUMENTS

| 168,996 | A | * | 10/1875 | Hess ........................ 177/255 |
|---|---|---|---|---|
| 3,836,755 | A | * | 9/1974 | Ehrat ........................ 235/383 |
| 3,993,151 | A | | 11/1976 | Wirth |
| 4,078,624 | A | | 3/1978 | Bradley |
| 4,261,428 | A | | 4/1981 | Bradley |
| 4,419,734 | A | * | 12/1983 | Wolfson et al. ............. 702/129 |
| 4,481,985 | A | | 11/1984 | Bruder et al. |
| 4,838,371 | A | | 6/1989 | Rupprecht et al. |
| 7,092,789 | B2 | | 8/2006 | Chavez et al. |
| 7,119,287 | B2 | | 10/2006 | Kroll et al. |
| 2005/0077352 | A1 | | 4/2005 | Gudbjartsson |
| 2006/0276933 | A1 | | 12/2006 | Chavez et al. |

* cited by examiner

*Primary Examiner*—Randy W Gibson
(74) *Attorney, Agent, or Firm*—Michael J. Weins; Jeffrey E. Semprebon

(57) ABSTRACT

A shelving system for use with a load cell has a frame, to which the load cell is mounted, and a rack residing within the frame and having a load cell proximity surface supported on the load cell by a pivotal contact element. The rack is stabilized by an anti-sway system having three lever arms connected between the frame and the rack and spaced apart from the load cell proximity surface. A first and a second lever arm are parallel and spaced apart from each other, and extend parallel to two faces of the rack, while a third lever arm extends substantially normal to the first and the second lever arms. A fourth lever arm can be provided, located in close proximity to the load cell proximity surface and extending parallel to at least one of the other lever arms.

20 Claims, 8 Drawing Sheets

SHELVING SYSTEM FOR USE WITH LOAD CELL

FIELD OF THE INVENTION

The present invention relates to a shelving system for use with a load cell to allow the weight of inventory items stored on the shelving system to be monitored.

BACKGROUND OF THE INVENTION

It is frequently desirable to monitor an inventory to reduce pilferage. One means for doing so is by measuring the change, as a function of time, of the weight of a support structure on which the inventory is stored. The change in weight is monitored by one or more scales on which the support structure rests. U.S. Publication No. 2005/0077352A1 teaches one example of an inventory monitoring system which uses weight changes to monitor inventory. To avoid erroneous readings due to artifacts resulting from loading and unloading inventory from the support structure, it is desirable to configure the support system to limit the motion of the supporting structure to essentially vertical motion, and to rapidly damp any transitory motion associated with horizontal motion. This is particularly true for an inventory of items in a retail setting, where the frequent loading or removal of items causes torques on the supporting element due to friction, impacts, and changes in the distribution of weight.

U.S. Pat. No. 4,481,985 teaches an apparatus for measuring fluent material where stabilizers are interposed between a conical cylindrical chamber and a frame. The stabilizers are a pair of leaves that are connected between the frame and limbs attaching to each side of the chamber and serve to inhibit any nutation, tilt or other disorientation of the chamber from its optimal vertical position due to tangential introduction of the fluent material. This apparatus would not be suitable for storing and monitoring an inventory of individual product items, and the stabilizers do not appear to be designed to counter forces applied at a large vertical distance from the stabilizers.

U.S. Pat. No. 4,261,428 teaches a platform weighing apparatus for measurement of a load with a load cell. The apparatus has a load supporting platform which is linked to a stationary base platform by a stabilizing system having two pairs of arms. Each pair of arms is pivotably attached at one end to the load support platform, and at the other end to the base platform, with the arms in each pair rigidly connected so as to pivot together. The pivot axes of the pairs of arms are arranged perpendicularly. This apparatus is reported to be designed to monitor heavy loads, and thus the massive structure of the connection, the rigid connections between the arms to resist torsional loads, and frictional resistance to pivoting may not affect its performance in this role; however, this apparatus would not be well suited to measuring small weight changes associated with shelved inventory.

Thus, there is a need for a shelving system which can be used with a load cell to allow monitoring an inventory of retail items as the items are loaded onto and removed from the shelving system.

SUMMARY OF THE INVENTION

The present invention is for a shelving system which employs a load cell to monitor the weight of the items stored on the shelving system. The shelving system has a frame having a frame height $H_F$ and terminating in a first pair of frame faces and further bounded by a second pair of frame surfaces. Preferably, the frame has a substantially rectangular frame footprint. The frame has a load cell support platform, to which the load cell is attached.

A rack having a rack height $H_R$ has a first pair of rack faces that are spaced apart at a first rack face pair separation distance $D_1$. The rack is further bounded by a second pair of rack faces that are spaced apart at a second rack face pair separation distance $D_2$. The rack is configured with a rack footprint that resides within the frame footprint. The rack has at least one shelf, which is substantially horizontal in service. A load cell proximity surface is provided on the rack, and is positioned in close proximity to the load cell when the system is in service. A pivotal contact element is interposed between the load cell proximity surface and the load cell.

To provide a response to changes in load which is rapid and reliable, it is important to stabilize the rack in the event that the user disturbs the stability of the rack by loading or removing stock from the rack; such loading and unloading may introduce transient motions which, without structure to damp the effect of such disturbances, will require substantial time to decay. The stiffness of the rack will, in part, limit the transient motions resulting from twisting and bending of the rack that may occur when the rack is loaded. To further stabilize the rack, it is necessary to limit the transient motion between the rack and the frame but, at the same time, the stabilizing structure employed should not cause resistive forces that will impede rapid response to small load changes. To provide such stabilization, an anti-sway and transient damping system is provided (hereinafter referred to as an anti-sway system).

The anti-sway system has a first lever arm which extends parallel to the second pair of rack faces. The first lever arm is affixed to the frame and to the rack at connection points that are spaced apart to create a first arm effective length $L_1$.

A second lever arm, which is preferably parallel to the first lever arm and similar in dimensions, is also affixed to the frame and to the rack in an analogous manner as the first lever arm to create a second arm effective length $L_2$.

The first lever arm and the second lever arm are spaced apart by an arm separation $S_A$. It is preferred that the arm separation $S_A$ separating the first and second lever arms be greater than about ¾ of the second rack face pair separation distance $D_2$. Preferably, the first and second lever arms are substantially symmetrically disposed with respect to the pivotal contact element and essentially straddle the rack.

A third lever arm is provided, which is affixed to the frame and to the rack at connection points to create a third arm effective length $L_3$. The third lever arm is positioned substantially normal to the first and second lever arms.

The first, second, and third lever arms are in a spaced apart relationship with respect to the load cell proximity surface such that the closest of these lever arms defines a minimum vertical separation $S_V$ from the load cell proximity surface. Preferably, this minimum vertical separation $S_V$ is a substantial portion of the rack height $H_R$, and is frequently greater than about ¾ the rack height $H_R$.

It is preferred for a fourth lever arm to be provided, particularly in situations where the rack and/or the frame is somewhat flexible or when the dimensions of the shelving system are such that substantial moments about the pivotal contact are generated by loading and unloading inventory to and from the rack. When provided, the fourth lever arm is affixed to the frame and to the rack at connection points that are spaced apart so as to create a fourth arm effective length $L_4$. The fourth lever arm is preferably positioned substantially parallel to at least one of the first lever arm, the second lever arm, and the third lever arm. Unlike the other three lever arms, the fourth lever arm is located in close proximity to the horizontal plane of the load cell proximity surface. It is also preferred that the fourth lever arm be positioned with respect to the pivotal contact element such that the attachment of the load cell to the load cell support platform resides between the pivotal contact element and the fourth lever arm.

It is also preferred that the lever arm effective lengths $L_1$, $L_2$, $L_3$, and $L_4$ (when a fourth lever arm is present) are at least about ½ of the minimum of the first rack face pair separation distance $D_1$ and the second rack face pair separation distance $D_2$.

The lever arms are preferably made from rod stock, typically round, square or rectangular in shape. The cross section should be sufficiently robust that the arms will not be subject to plastic deformation in use. Cylindrical rods have a benefit in that they can be easily threaded for attaching to the frame and to the rack, and their effectiveness is not dependent on the angular orientation of the rod when installed, as would be the case for square or rectangular rods.

For many applications, it is preferred for the first pair of frame faces to form a frame front face and a frame rear face, the frame front face having an opening to allow access to the rack. In such cases, the second pair of frame faces form frame side faces, and the first pair of rack faces form a rack front face and a rack rear face, while the second pair of rack faces form rack side faces. In this situation, it is preferred that the first and second lever arms extend normal to the front and rear faces of the frame and the rack, and thus are well-positioned to stabilize the rack against front-to-rear forces resulting from loading and unloading inventory items on and off the rack. When a fourth lever arm is employed in situations where the first pair of frame faces form a frame front face and a frame rear face, it is also generally preferred that the fourth lever arm be positioned parallel to the first and second lever arms.

DETAILED DESCRIPTION OF THE PREFERRED EMBODIMENTS

Figure 1:
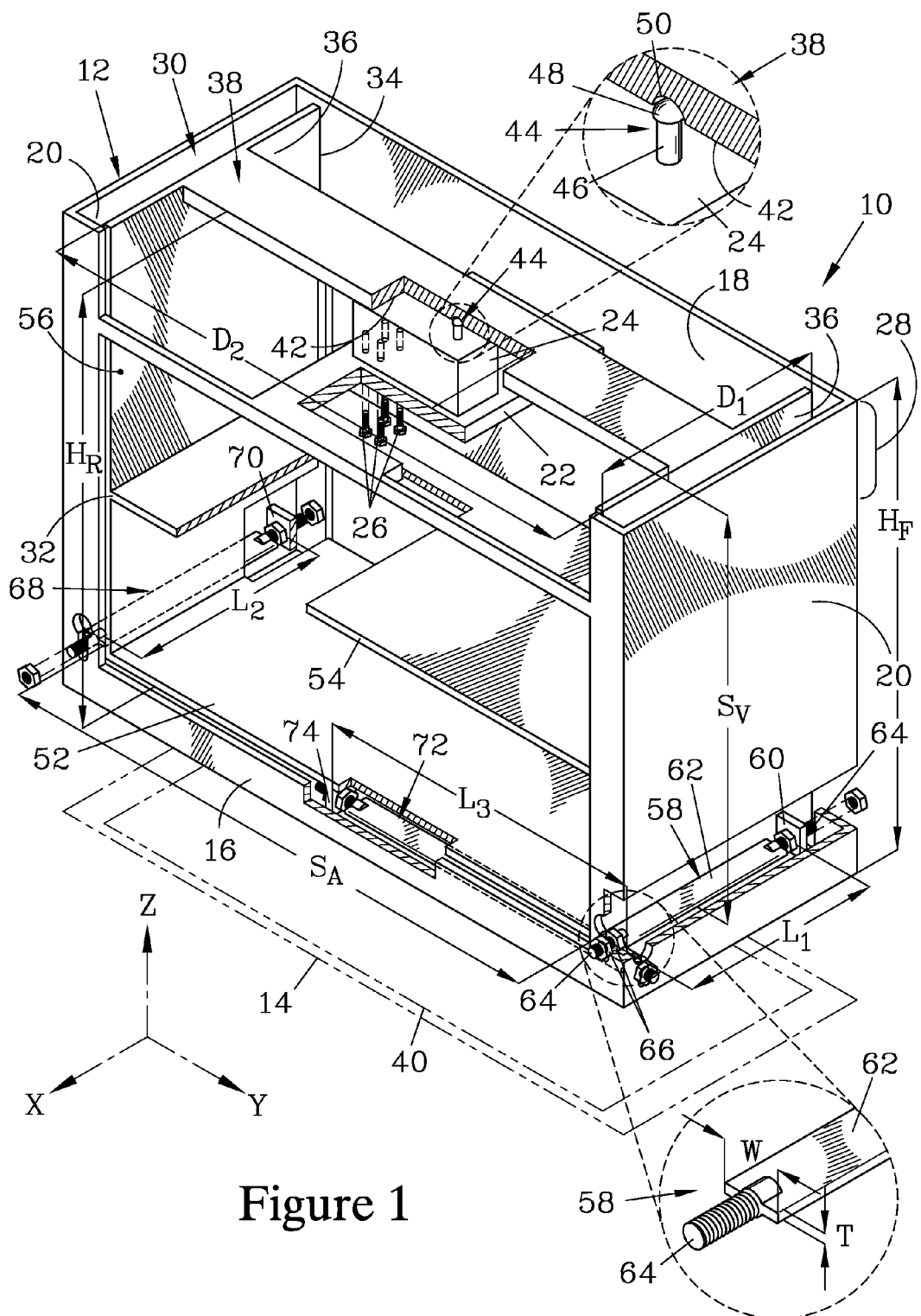
FIG. 1 is an isometric view one embodiment of a shelving system of the present invention which has a rectangular frame, to which a load cell is attached, and a rack having a lower shelf and an intermediate shelf. A first lever arm and a second lever arm attach to the front face of the frame and are substantially parallel to each other. A third lever arm is substantially normal to the first and second lever arms, and attaches to the frame and to the rack. The lever arms of this embodiment each have a rectangular cross section, and the three lever arms are in close proximity to the lower shelf of the rack, and thus are spaced apart from the load cell, which is positioned in a top region of the frame.

FIG. 1 is an isometric view of a shelving system 10 that forms one embodiment of the present invention. The shelving system 10 has a frame 12 having a frame height $H_F$ and a rectangular frame footprint 14. The frame 12 is bounded by a frame front face 16 and a frame rear face 18, which form a first pair of frame faces, and by a pair of frame side faces 20, which form a second pair of frame faces. The frame 12 has a load cell support platform 22 for supporting a load cell 24. The load cell 24 is attached to the support platform 22 by bolts 26 and resides in a top region 28 of the frame 12.

A rack 30 is provided, having a rack height $H_R$. The rack 30 is bounded by a rack front face 32 and a rack rear face 34, which form a first pair of rack faces that are separated by a first rack face pair separation distance $D_1$. The rack 30 is further bounded by a pair of rack side faces 36 which form a second pair of rack faces that are separated by a second rack face pair separation distance $D_2$. The rack 30 also has an upper cross member 38. The rack 30 has a rack footprint 40 that is configured to reside within the frame footprint 14. In service, the upper cross member 38 is positioned such that its lower surface serves as a load cell proximity surface 42 which resides above the load cell 24. A pivotal contact element 44 is interposed between the load cell proximity surface 42 and the load cell 24. The pivotal contact element 44 has a post 46 which is embedded in the load cell 24 and terminates in a hemispherical cap 48. The hemispherical cap 48 is configured to rotatably engage a cavity 50 in the load cell proximity surface 42 such that, when so engaged, the rack 30 is suspended from the load cell 24.

The rack 30 also has a lower shelf 52 and an intermediate shelf 54 for storage of inventory items. The frame front face 16 has an opening 56 that allows access to inventory stored on the shelves (52, 54). Inventory placed on either of these shelves (52, 54) will change the load applied to the load cell 24. This change in load, when used with an inventory control system such as is taught in U.S. Publication No. 2005/0077352A1, allows one to monitor the inventory as a function of time.

The process of adding inventory to and removing inventory from the rack 30 or bumping the rack 30 when in service can subject the rack 30 to forces that result in transitory disturbances, thereby distorting the true change in load on the load cell 24 as a function of time. The transitory disturbances can, in part, result from flexing of the rack 30 as well as transitory motion between the frame 12 and the rack 30. An anti-sway system is provided to dampen transitory motions between the rack 30 and the frame 12.

In the embodiment shown FIG. 1, the rack height $H_R$ is relatively short, and the rack face pair separation distances $D_1$ and $D_2$ are such that the maximum moment introduced during loading and unloading of the rack 30 will be relatively small. Also, since the rack 30 is relatively short, it is relatively stiff and no compensation for rack flexibility need be provided. Additional compensation for when these conditions do not apply is discussed below where such compensation is employed in other embodiments. Accordingly, the anti-sway system of this embodiment has three lever arms connected between the frame 12 and the rack 30.

A first lever arm 58 is positioned between the frame 12 and the rack 30 and is attached to a tab 60 which in turn attaches to one of the rack side faces 36 near to the rack rear face 34. The first lever arm 58 extends forward and attaches to the frame front face 16, the first lever arm 58 extending substantially parallel to the rack side faces 36. The tab 60 and the frame front face 16 provide first lever arm connection points for attachment of the first lever arm 58, these connection points being separated by a first arm effective length $L_1$.

In this embodiment, the first lever arm 58 has a body 62 which is rectangular in cross section, having a width W and a thickness T and terminating in threaded segments 64 for attachment to the tab 60 and the frame front face 16 by nuts 66 or similar internally-threaded fasteners. When so attached, the nuts 66 maintain the first lever arm 58 in a substantially horizontal orientation having the width W also horizontal when the system 10 is in service.

Similarly, a second lever arm 68 is provided, which is parallel to the first lever arm 58 and is similarly connected to the frame 12 and to the rack 30, attaching at one end to a tab 70 on the rack 30 located in close proximity to the rack rear face 34 and at the other end to the frame front face 16. The tab 70 and the frame front face 16 provide second lever arm connection points for attachment of the second lever arm 68, and create a second arm effective length $L_2$.

Both of these lever arms (58, 68) are substantially parallel to the rack side faces 36 as well as to each other, and are preferably symmetrically disposed with respect to the pivotal contact element 44. The lever arms (58, 68) are spaced apart by an arm separation $S_A$ which, in this embodiment, is greater than the second rack face pair separation distance $D_2$ so as to straddle the rack 30. The first and second lever arms (58, 68) are also positioned in the vicinity of the lower shelf 52, and are disposed in a horizontal reference plane positioned slightly above the lower shelf 52. The first and second lever arms (58, 68) are separated from the load cell proximity surface 42 by a vertical separation which is only slightly less than the rack height $H_R$; in this embodiment, the vertical separation of the first and second lever arms (58, 68) from the load cell proximity surface 42 defines a minimum vertical separation $S_V$. These first two lever arms (58, 68) limit swaying motion as well as damp transitory motion resulting from the forces applied in the X direction that the lower shelf 52 may experience when inventory is being placed thereon or removed therefrom.

A third lever arm 72, which is also rectangular in cross section, is normal to the first and second lever arms (58, 68). The third lever arm 72 is attached to one of the frame side faces 20 and to a tab 74 which is positioned roughly midway along the rack front face 32. The frame side face 20 and the tab 74 provide third lever arm connection points that create a third arm effective length $L_3$. The third arm effective length $L_3$ should be chosen to provide the third lever arm 72 sufficient flexibility in the Z direction to readily deflect in that direction while allowing the third lever arm 72 to damp transitory motions resulting from loading the shelves (52, 54) by sliding inventory onto one of the shelves (52, 54) with a significant component in the Y direction.

For the shelving system 10, the third lever arm 72 resides in close proximity to and below the horizontal reference plane of the first and second lever arms (58, 68), and below the lower shelf 52. While all three arms (58, 68, 72) are at a substantial separation form the load cell proximity surface 42, the minimum vertical separation $S_V$ is defined between the first and second lever arms (58, 68) and the load cell proximity surface 42, since the first and second lever arms (58, 68) are vertically closer to the load cell proximity surface 42. While the minimum vertical separation $S_V$ can be varied, it should be appreciated that the effectiveness of the lever arms (58, 68, 72) increases as their vertical separation from the load cell proximity surface 42 increases. Thus, having the minimum vertical separation $S_V$ relatively large, for example about ¾ of the rack height $H_R$ or greater, is advantageous.

While there is freedom in selecting the effective lengths of the lever arms (58, 68, and 72), it is preferred that the lengths be selected so as to provide sufficient length that the lever arms (58, 68, 72) can readily be elastically deflected. A preferred guideline for selecting the lever arm effective lengths $L_1$, $L_2$, and $L_3$ is that they each be at least about ½ of the minimum of the first rack face pair separation distance $D_1$ and the second rack face pair separation distance $D_2$. In the shelving system 10, the first rack face pair separation distance $D_1$ is less than the second rack face pair separation distance $D_2$, and thus, when this guideline is followed, the lever arm effective lengths $L_1$, $L_2$, and $L_3$ will be selected to be at least about ½ of the first rack face pair separation distance $D_1$.

Figure 2:
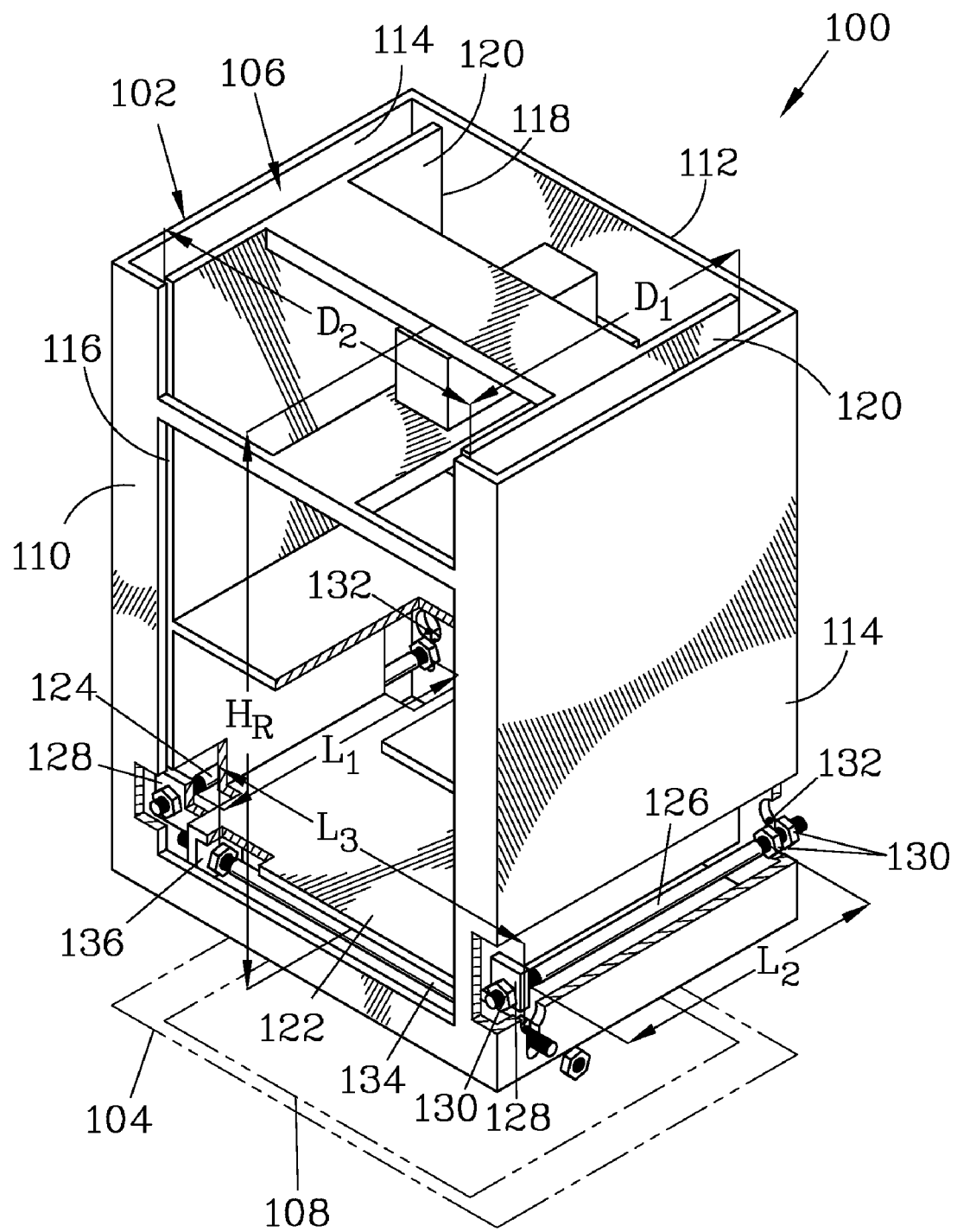
FIG. 2 is an isometric view of a shelving system which forms another embodiment of the invention that is similar to the embodiment shown in FIG. 1, but which differs in two respects. First, the frame has a substantially square foot print, and secondly, the lever arms are cylindrical.

FIG. 2 is an isometric view of another embodiment, a shelving system 100 which differs in part from the shelving system 10 shown in FIG. 1 in that it has a frame 102 with a nearly square frame footprint 104. The shelving system 100 also has a rack 106 which has a nearly square rack footprint 108.

The frame 102 is bounded by a frame front face 110, a frame rear face 112, and a pair of frame side faces 114. Again, the frame front face 110 and the frame rear face 112 form a first pair of frame faces, while the pair of frame side faces 114 form a second pair of frame faces. In this embodiment, the rack 106 is a low profile rack having a relatively short rack height $H_R$ providing a stiff rack similar to the rack 30 shown in FIG. 1. Similarly, the shelving system 100 is a compact system, having a relatively small footprint in addition to being relatively short. This compactness results in the moments introduced during loading and unloading of the rack 106 being relatively small. Thus, for this embodiment, three lever arms should again be adequate for the anti-sway system.

The rack 106 has a rack front face 116, a rack rear face 118, and a pair of rack side faces 120. The rack front face 116 and the rack rear face 118 form a first pair of rack faces which are separated by a first rack face pair separation distance $D_1$, while the pair of rack side faces 120 form a second pair of rack faces which are separated by a second rack face pair separation distance $D_2$. The rack 106 terminates in a lower shelf 122 and resides within the frame 102.

The anti-sway system in this embodiment employs lever arms that are thin cylindrical arms. A first lever arm 124 and a second lever arm 126 are each attached to the frame rear face 112 and to tabs 128 that are attached to the rack side faces 120 in close proximity to the rack front face 116. These tabs 128 are employed to attach the first and second lever arms (124, 126) to the rack 106 by use of nuts 130 that bracket the tabs 128. The first and second lever arms (124, 126) are secured to the frame 102 with nuts 130 that bracket passages 132 in the frame rear face 112 and, being so connected, the lever arms (124, 126) respectively have effective lengths $L_1$ and $L_2$, which are equal in this embodiment.

A third thin cylindrical lever arm 134 extends substantially normal to the first and second lever arms (124, 126), and is also located in close proximity to the lower shelf 122. The third lever arm 134 is attached to one of the frame side faces 114 and to a tab 136 which is positioned near the opposing rack side face 120 and adjacent to the rack front face 116. When so connected, the third lever arm 134 is provided with a third arm effect length of $L_3$, which in this embodiment is about equal to the first and second arm effective lengths $L_1$ and $L_2$. When thin cylindrical lever arms are employed, a ratio of diameter to length of at least about 1:50 has been found effective.

Figure 3:
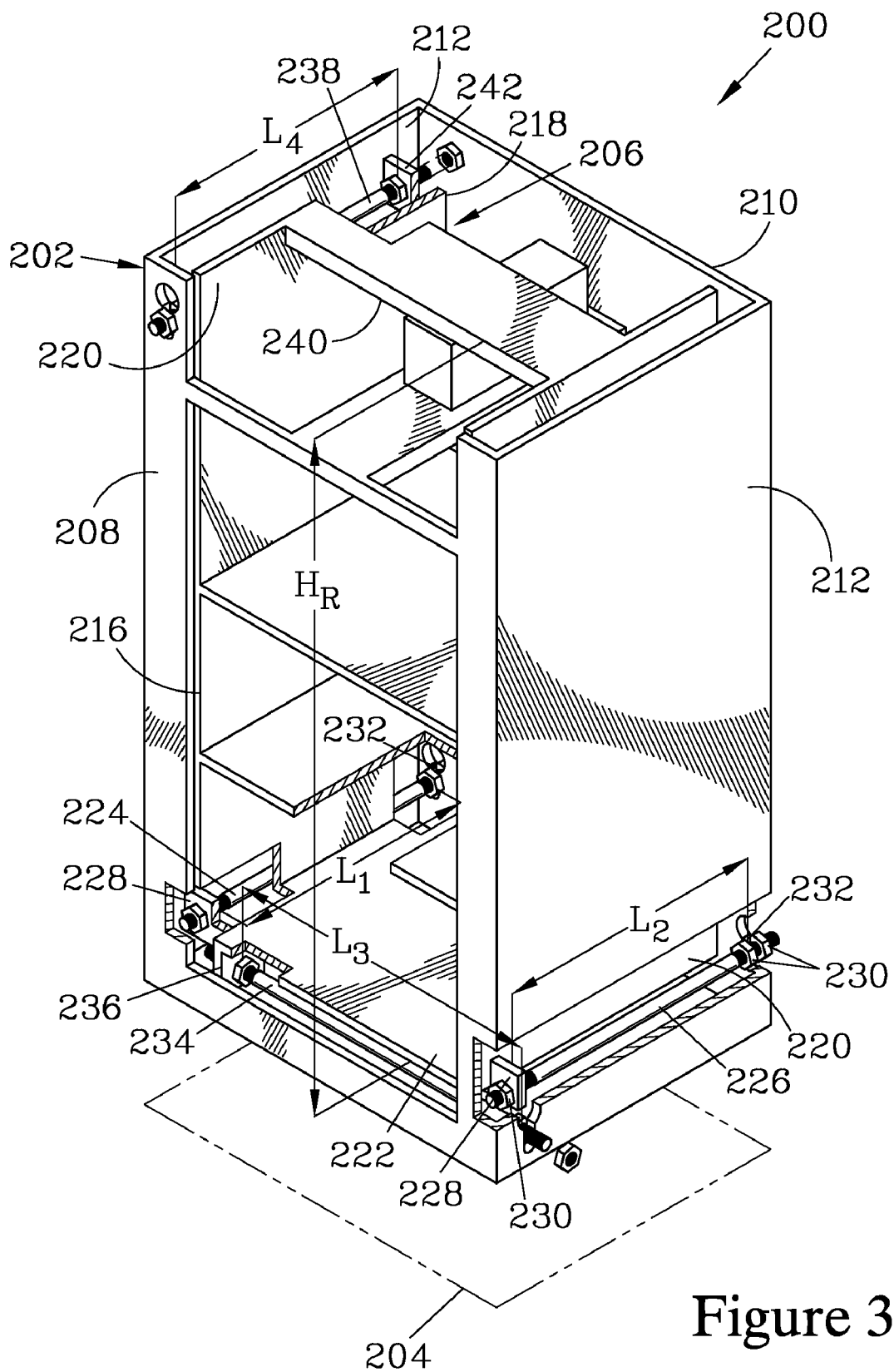
FIG. 3 is an isometric view of a shelving system for another embodiment of the present invention, which is similar to the embodiment shown in FIG. 2; however, the rack and frame of this embodiment are substantially taller than in the embodiment shown in FIG. 2, and the increased height of the rack accommodates a first shelf, a second shelf, and a third shelf on which inventory can be stored. The additional height makes the rack more subject to twisting during service. This embodiment employs a fourth lever arm to counter the effect of twisting. The fourth lever arm lies in close proximity to a horizontal plane containing a load cell proximity surface.

FIG. 3 is an isometric view of another embodiment, a shelving system 200 which again has a frame 202 with a nearly square frame footprint 204. However, this embodiment differs from the shelving system of FIG. 2 in that it is designed to support a rack 206 which has a rack height $H_R$ which is substantially greater than the height of the rack 106 of the embodiment illustrated in FIG. 2. The increased height of the rack 206 results in the rack 206 being more flexible than the rack 106, and the greater height can result in greater moments when forces are applied to the rack 206 as inventory items are loaded into or removed from the rack 206. To provide a greater degree of stabilization, the anti-sway system of this embodiment employs four lever arms, as discussed below.

The frame 202 is bounded by a frame front face 208, a frame rear face 210, and a pair of frame side faces 212, forming first and second pairs of frame faces. Similarly, the rack 206 has a rack front face 216, a rack rear face 218, and a pair of rack side faces 220, forming first and second pairs of rack faces. The rack 206 terminates in a lower shelf 222 and resides within the frame 202.

The anti-sway system in this embodiment employs lever arms that again are thin cylindrical arms. A first lever arm 224 and a second lever arm 226 are each attached at one end to the frame rear face 210 and at the other end to tabs 228 that are attached to the rack side faces 220 in close proximity to the rack front face 216. These tabs 228 are employed to attach the first and second lever arms (224, 226) to the rack 206 by use of nuts 230 that bracket the tabs 228, while the first and second lever arms (224, 226) are secured to the frame 202 with nuts 230 that bracket passages 232 in the frame rear face 210.

A third thin cylindrical lever arm 234 extends normal to the first and second lever arms (224, 226), and all three lever arms (224, 226, and 234) are located in close proximity to the lower shelf 222. The third lever arm 234 is attached to one of the frame side faces 212 and to a tab 236 which is positioned near the opposing rack side face 220 and adjacent to the rack front face 216. In this embodiment, as with the embodiment shown in FIG. 2, the three lever arms (224, 226, and 234) respectively have arm effective lengths $L_1$, $L_2$, and $L_3$, all of which are about equal.

In this embodiment, the rack 206 is further stabilized with respect to the frame 202 by a fourth lever arm 238, which extends substantially parallel to the first lever arm 224 and the second lever arm 226, but which resides in close proximity to a plane containing a load cell proximity surface 240 that is provided on the rack 206. The fourth lever arm 238 is attached to the frame 202 and the rack 206 in a manner similar to the connection of the first and second lever arms (224, 226), but is attached to the frame front face 208 and to a tab 242 positioned near the rack rear face 218. The frame front face 208 and the tab 242 provide fourth lever arm connection points that define a fourth arm effective length $L_4$. One of the functions of the fourth lever arm 238 is to limit transitory motion due to twisting of the rack 206 as it is loaded and unloaded. In the embodiment shown in FIG. 3, all lever arms (224, 226, 234, 238) have similar cross sections and arm effective lengths ($L_1$, $L_2$, $L_3$, $L_4$) so that their deformation characteristics will be similar. While the lever arms (224, 226, 234, 238) are shown with the arm effective lengths ($L_1$, $L_2$, $L_3$, $L_4$) being about the same, these lengths could be adjusted in view of the relative sharing of forces by the lever arms (224, 226, 234, 238). For example, in shelving systems with a relatively square footprint and a configuration as shown in FIG. 3, it has been found that the third lever arm 234 could have its third arm effective length $L_3$ be substantially shorter than the arm effective lengths ($L_1$, $L_2$, $L_4$) of the other lever arms (224, 226, 238).

Figure 4:
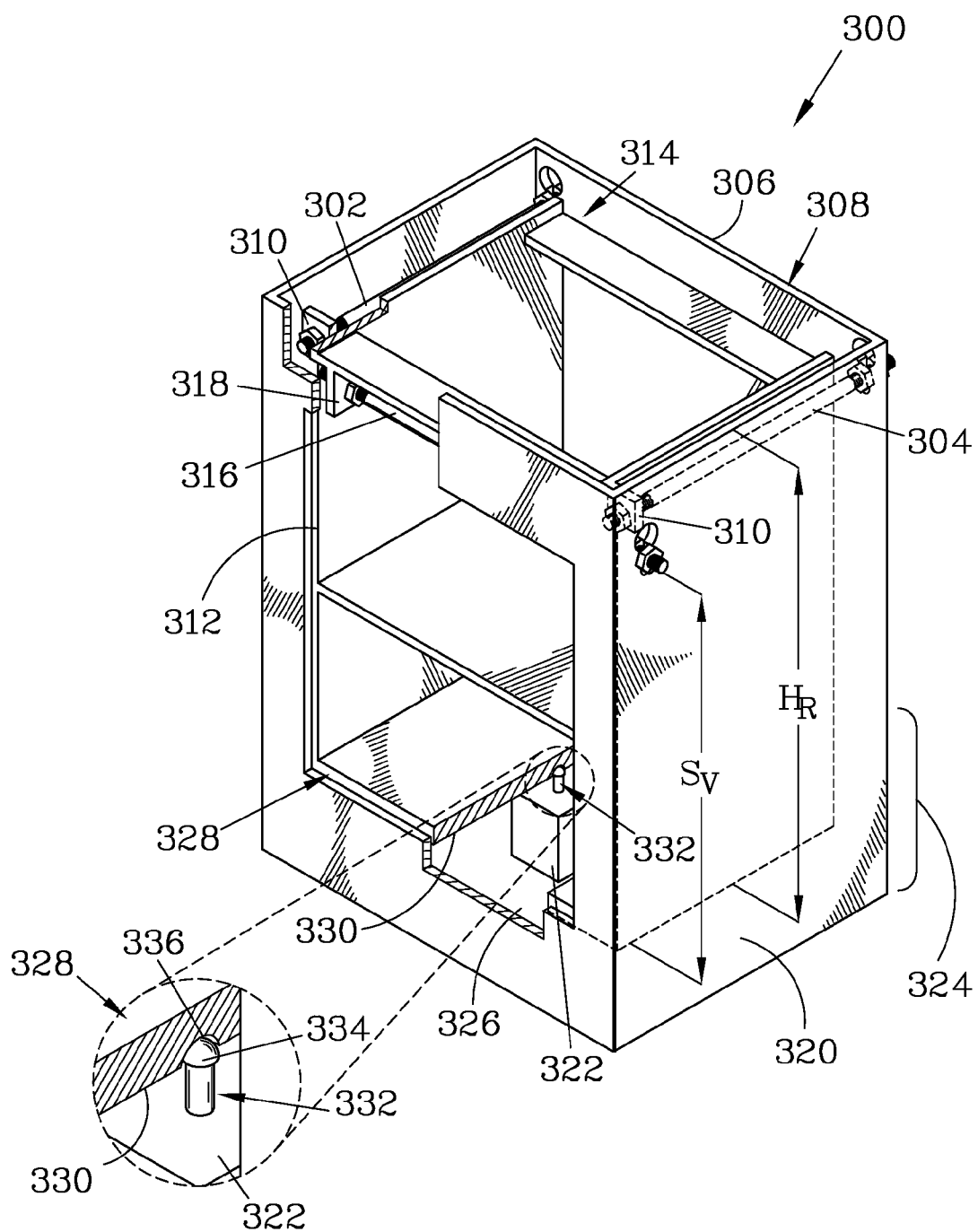
FIG. 4 is an isometric view of a shelving system for another embodiment that is similar to that shown in FIG. 2 and having the same lever arm configuration, but where the load cell resides in a bottom region of the frame, rather than in a top region. In this embodiment, the rack is supported above the pivotal contact element of the load cell and the three lever arms are spaced apart from the load cell and the pivotal contact element by a vertical separation that is approximately the same as the height of the rack. In this embodiment, the lever arms serve not only to damp transient motions introduced by adding and removing inventory but also to prevent tipping of the rack in the frame.

FIG. 4 is an isometric view of a shelving system 300 having a rack height $H_R$ and a substantially square footprint that are similar to those of the shelving system 100 shown in FIG. 2. The shelving system 300 again employs three lever arms and has a similar lever arm configuration as the embodiment shown in FIG. 2. A first lever arm 302 and a second lever arm 304 attach to a frame back face 306 of a frame 308 and to tabs 310 that are located near a rack front face 312 of a rack 314. A third lever arm 316 extends substantially normal to the first and second lever arms (302, 304) and is attached to a tab 318 on the rack 314 and to a frame side face 320 of the frame 308.

However, in this embodiment, the rack 314 is supported above a load cell 322, rather than being suspended therefrom, and the load cell 322 resides in a bottom region 324 of the frame 308. This configuration can be especially desirable when the shelving system 300 is mounted on a surface below eye level and it is desirable to be able to look over the rack, as it raises the shelves from the surface below making for easier access, and does not require a structure above for mounting the shelving system 300. The frame 308 has a load cell support platform 326, to which the load cell 322 is attached, while the rack 314 has a lower shelf 328 that is configured to provide a load cell proximity surface 330. A pivotal contact element 332 is interposed between the load cell proximity surface 330 and the load cell 322. The pivotal contact element 332 terminates in a hemispherical cap 334 that rotatably engages a cavity 336 in the load cell proximity surface 330. The first and second lever arms (302, 304) reside in a common horizontal plane that is in close vertical proximity to but above the third lever arm 316; thus, in this embodiment, the third lever arm 316 is vertically separated from the load cell proximity surface 330 by a minimum vertical separation $S_V$ which is somewhat less than the rack height $H_R$.

Figure 5:
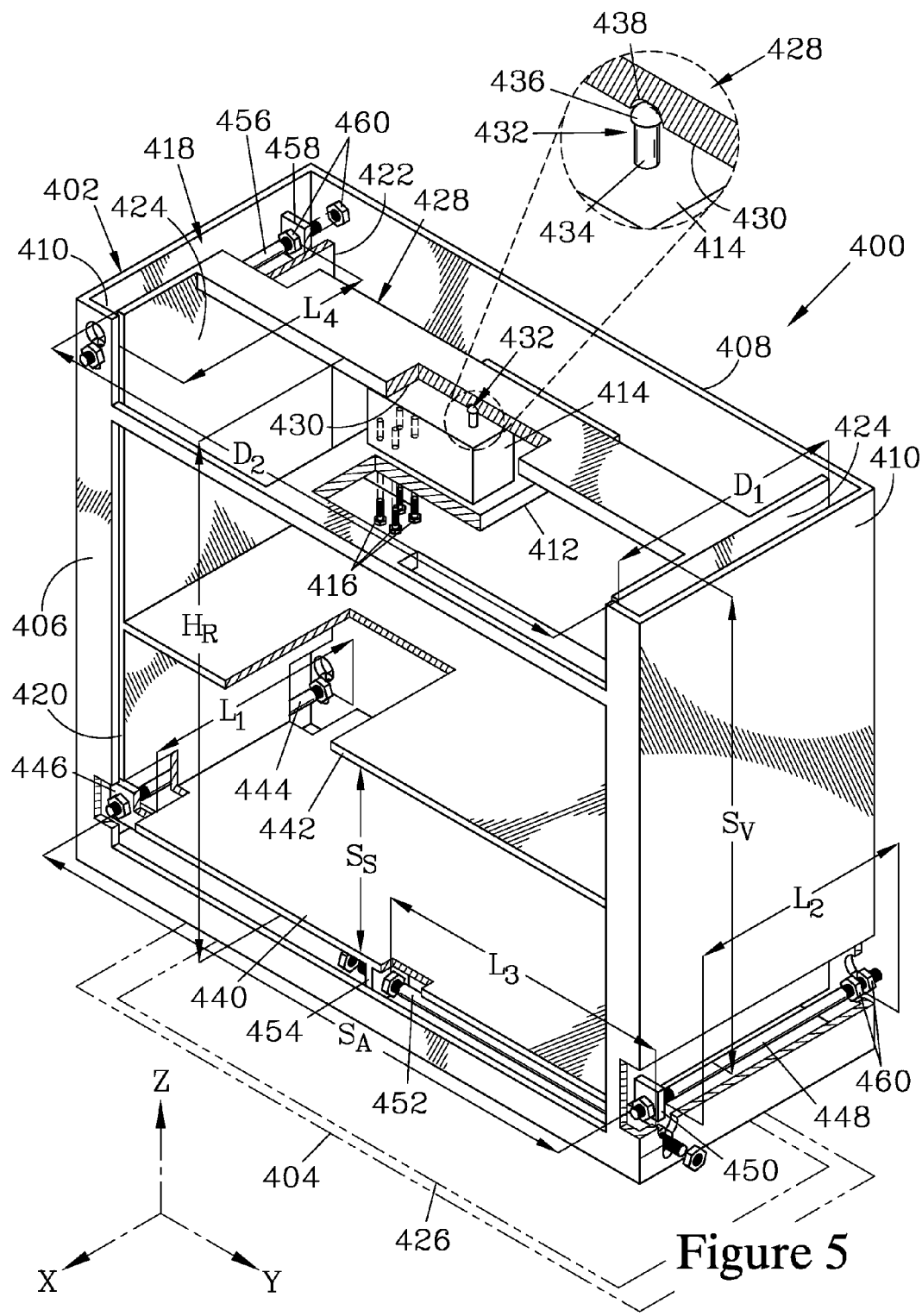
FIG. 5 is an isometric view of a shelving system for another embodiment of the present invention, which is similar to the embodiment shown in FIG. 1; however, this embodiment has a rack which is higher than that of the embodiment shown in FIG. 1. This embodiment also differs in that slender cylindrical rods are employed for the lever arms. Also, in view of the greater height of the rack, this embodiment employs a fourth slender cylindrical rod as a fourth lever arm, as does the embodiment shown in FIG. 3. Again, the fourth lever arm lies in close proximity to a horizontal plane in which a load cell proximity surface resides.

FIG. 5 is an isometric view of a shelving system 400 that forms another embodiment of the present invention. In this embodiment long, thin cylindrical rods are again employed as lever arms. The shelving system 400 has a frame 402 having a rectangular frame footprint 404. The frame 402 is bounded by a frame front face 406, a frame rear face 408, and a pair of frame side faces 410, the frame front face 406 and the frame rear face 408 forming a first pair of frame faces and the pair of frame side faces 410 forming a second pair of frame faces. The frame 402 has a load cell support platform 412 for supporting a load cell 414. The load cell 414 is attached to the load cell support platform 412 by bolts 416.

The frame 402 also differs in that it is designed to accommodate a rack 418 having a rack height $H_R$ which is substantially greater than the rack height of the embodiment shown in FIG. 1. Again, this creates the potential for substantial moments resulting from loading or unloading the rack 418. While this example creates a potential for increased moments due to the height of the rack 418, such potential could also be created by a substantial increase in the footprint of the rack 418.

The rack 418 is bounded by a rack front face 420 and a rack rear face 422, which form a first pair of rack faces separated by a first rack face pair separation distance $D_1$, and a pair of rack side faces 424, which form a second pair of rack faces separated by a second rack face pair separation distance $D_2$. The rack 418 has a rack footprint 426 that is configured to reside within the frame footprint 404 of frame 402 in service. The rack 418 in this embodiment is suspended from the load cell 414, and has an upper cross member 428. The upper cross member 428 is positioned such that its lower surface serves as a load cell proximity surface 430 which resides above the load cell 414. A pivotal contact element 432 is interposed between the load cell proximity surface 430 and the load cell 414. The pivotal contact element 432 has a post 434 which is embedded in the load cell 414 and terminates in a hemispherical cap 436. The hemispherical cap 436 is configured to rotatably engage a cavity 438 in the load cell proximity surface 430. The rack 418 also has a lower shelf 440 and an intermediate shelf 442 for storage of inventory items. These shelves are spaced apart at a greater shelf separation $S_S$ than the separation of the shelves illustrated in FIG. 1, so as to allow inventory with greater height to be stored thereon.

Again, an anti-sway system is provided to limit the motion of the rack 418 relative to the frame 402, as well as to damp transitory motion resulting from the forces applied during loading and unloading of the rack 418. The anti-sway system again includes a series of lever arms, each of which is affixed at one end to the rack 418 and at the other end to the frame 402. The lever arms are flexible so as to allow limited bending while remaining an essentially fixed length, thereby serving to limit any lateral movement resulting from loading and unloading the rack 418.

In the embodiment shown in FIG. 5, a first lever arm 444 is positioned between the frame 402 and the rack 418 and attached to the frame rear face 408 of the frame 402, extending forward and attaching to the rack 418 via a tab 446 which is situated near the rack front face 420. The first lever arm 444 of this embodiment is thus provided with a first arm effective length $L_1$ which is about equal to the first rack face pair separation distance $D_1$. Attaching the first lever arm 444 to the frame rear face 408 provides greater stability against forces applied to the rack 418 as items are removed by sliding forward towards the rack front face 420, as this motion will tend to place the first lever arm 444 in tension. Also, having the first lever arm 444 attached to the frame rear face 408 provides a neater appearance when the shelving system 400 is viewed from the front.

Similarly, a second lever arm 448 is provided, which is parallel to the first lever arm 444 and is similarly connected to the frame 402 and the rack 418, attaching to the frame rear face 408 and to a tab 450 on the rack 418 located in close proximity to the rack front face 420. Again, the second lever arm 448 is provided with a second arm effective length $L_2$ which, in this embodiment, is about equal to the first rack face pair separation distance $D_1$. Both of these lever arms (444, 448) are positioned in the vicinity of the lower shelf 440, and thus are positioned at a substantial distance from the load cell proximity surface 430; the first and second lever arms (444, 448) define a minimum vertical separation $S_V$ from the load cell proximity surface 430, for reasons set forth below. The lever arms (444, 448) are positioned between the rack 418 and the frame 402, and are spaced apart by an arm separation $S_A$ which is greater than the second rack face pair separation distance $D_2$, so that the lever arms (444, 448) straddle the rack 418. These first two lever arms (444, 448) limit swaying and damp transitory motion resulting from the forces applied in the X direction that the lower shelf 440 may experience when inventory is being placed thereon or removed therefrom.

A third lever arm 452 extends normal to the first and second lever arms (444, 448), and is also located in close proximity to the lower shelf 440 yet below the plane in which the first and second lever arms (444, 448) reside. Thus, the third lever arm 452 is substantially spaced apart from the load cell proximity surface 430 and resides at a greater separation from the load cell proximity surface 430 than the first two lever arms (444, 448), which define the minimum vertical separation $S_V$. The third lever arm 452 is attached to one of the frame side faces 410 and to a tab 454 which is positioned midway along the rack front face 420. This provides the third lever arm 452 with a third arm effective length $L_3$ which is about ½ the second rack face pair separation distance $D_2$, and is about equal to the first rack face pair separation distance $D_1$. This length should provide sufficient flexibility in the Z direction while allowing the third lever arm 452 to damp transitory motions resulting from loading the shelves (440, 442) by sliding inventory onto a shelf with a significant component in the Y direction.

In this embodiment, the rack 418 is further stabilized with respect to the frame 402 by a fourth lever arm 456, which is spaced apart from the plane of the first and second lever arms (444, 448) and resides in close proximity to the load cell proximity surface 430. The fourth lever arm 456 is attached to the frame 402 and the rack 418 in a manner similar to the connection of the first and second lever arms 444 and 448, but is attached to the frame front face 406 and to a tab 458 positioned near the rack rear face 422, providing the fourth lever arm 456 with a fourth arm effective length $L_4$ which, in this embodiment, is also about equal to the first rack face pair separation distance $D_1$. One of the functions of the fourth lever arm 456 is to limit transitory motion due to twisting of the rack 418 as it is loaded and unloaded. As is illustrated in FIG. 5, the fourth lever arm 456 is positioned such that it extends substantially parallel to the first lever arm 444 and the second lever arm 448 and resides in a plane that passes through or is in close proximity to the load cell 414. The fourth lever arm 456 is also preferably positioned such that the bolts 416 which provide the attachment of the load cell 414 to the load cell support platform 412 are located between the fourth lever arm 456 and the pivotal contact element 432. Having the fourth lever arm 456 so positioned has been found more effective than other locations. In some instances, such as in the shelving system 300 shown in FIG. 4, so positioning the fourth lever arm would result in the fourth lever arm being parallel to the third lever arm.

Adjustability of the lever arms (444, 448, 452, 456) with respect to the frame 402 and the rack 418 is provided by use of paired nuts 460 that allow the position of the rack 418 to be adjusted for centering with respect to the frame 402. The lever arms (444, 448, 452, 456) are long and slender so that they can flex slightly without substantially affecting the response of the load cell 414.

Figure 6:
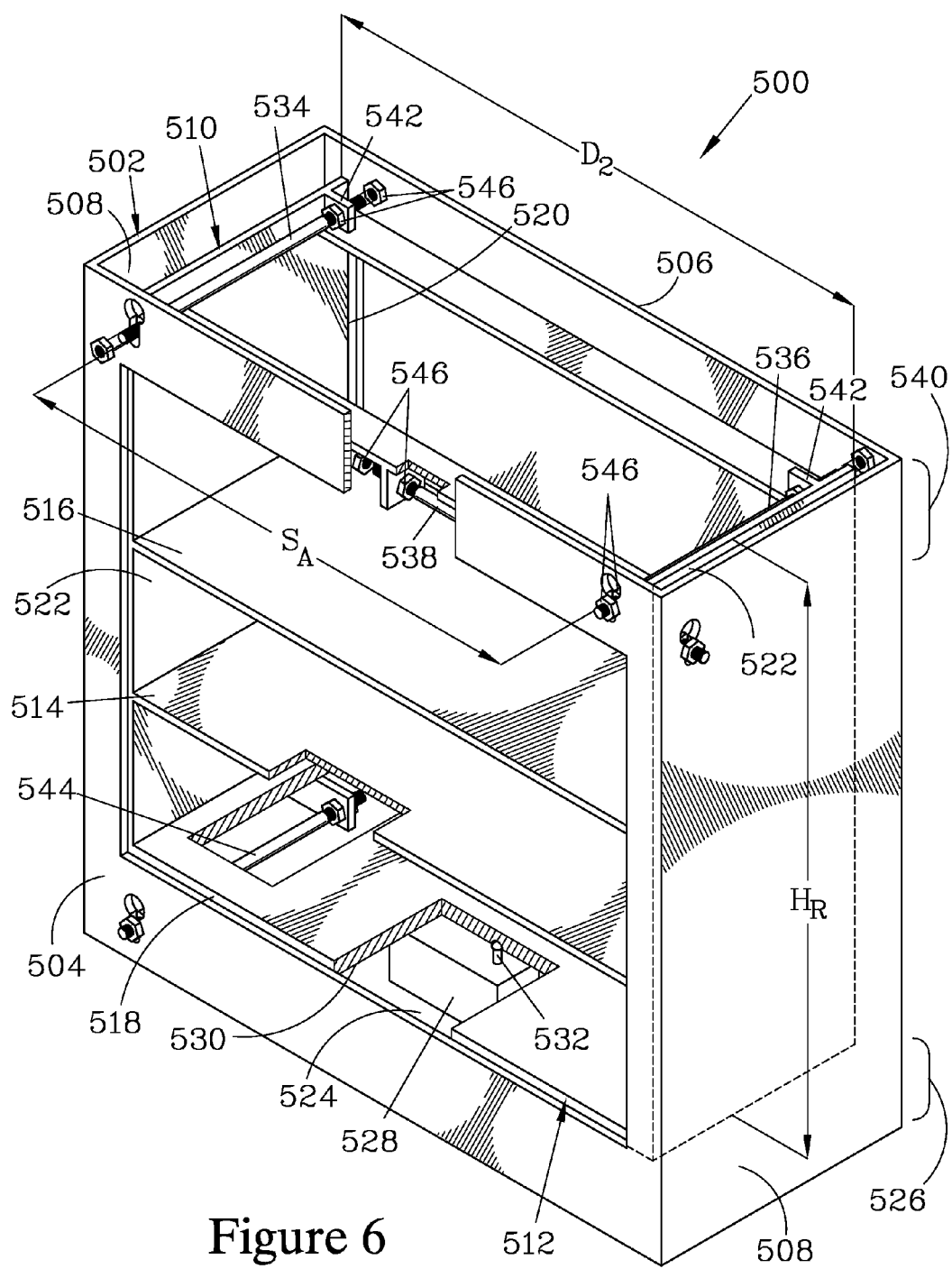
FIG. 6 is an isometric view of an embodiment which is similar to that shown in FIG. 5, but where the rack is supported above the load cell and is stabilized with three lever arms tying the top region of the rack to the top region of the frame, and a fourth lever arm tying the bottom region of the rack to the bottom region of the frame.

FIG. 6 is an isometric view of a shelving system 500 that forms another embodiment of the present invention, which shares many of the features of the shelving system 400 shown in FIG. 5, but where the rack rests on the load cell, rather than being suspended therefrom. The shelving system 500 again has a frame 502 which is bounded by a frame front face 504, a frame rear face 506 and a pair of frame side faces 508. The shelving system 500 has a rack 510 which resides within the frame 502 and again is a high profile rack having a rack height $H_R$. In this embodiment, the additional height compared to the height of the rack 30 of the embodiment shown in FIG. 1 is provided to accommodate an additional shelf rather than to provide greater shelf separation, as was done in the embodiment shown in FIG. 5. Accordingly, the rack 510 has a lower shelf 512, an intermediate shelf 514, and a top shelf 516. The rack 510 is bounded by a rack front face 518, a rack rear face 520 and a pair of rack side faces 522. The frame 502 has a load cell support platform 524, which in this embodiment is located in a bottom region 526 of the frame 502. A load cell 528 is attached to the load cell support platform 524.

In this embodiment, the lower shelf 512 has a lower surface which serves as a load cell proximity surface 530 that resides above the load cell 528 and is engaged by a pivotal contact element 532 that is interposed between the load cell proximity surface 530 and the load cell 528.

The shelving system 500 again has an anti-sway system to limit transitory motion of the rack 510 relative to the frame 502. In this embodiment, the anti-sway system has a first lever arm 534, a second lever arm 536, and a third lever arm 538 that are located in a top region 540 of the frame 502. Thus, the first, second, and third lever arms (534, 536, 538) are positioned at a substantial distance from the load cell proximity surface 530. Again, the first and second lever arms (534, 536) extend parallel to each other, both being connected between the frame 502 and the rack 510. In this embodiment, the first and second lever arms (534, 536) attach to the frame front face 504 and extend rearward to attach to tabs 542 which attach to the rack side faces 522. In this embodiment, the first and second lever arms (534, 536) are spaced apart by an arm separation $S_4$ which is less than a rack face pair separation distance $D_2$ between the rack side faces 522, so as to allow the frame side faces 508 to reside in closer proximity to the rack side faces 522. However, the arm separation $S_4$ should be kept relatively large, and in this example is selected to be greater than ¾ of the rack face pair separation distance $D_2$ so that the first lever arm 534 and the second lever arm 536 quasi-bracket the rack 510. The first and second lever arms (534, 536) are symmetrically displaced with respect to the pivotal contact element 532. The third lever arm 538 is connected between the frame 502 and the rack 510 and is normal to the first and second lever arms (534, 536).

Since the rack 510 is relatively tall, the shelving system 500 illustrated also has a fourth lever arm 544 that extends parallel to the first lever arm 534 and the second lever arm 536, but which is spaced apart from the plane in which the first and second lever arms (534, 536) reside. Thus, in this embodiment, the fourth lever arm 544 is located in the bottom region 526 of the frame 502, and resides in close proximity to the load cell proximity surface 530.

The effective lengths of the lever arms (534, 536, 538, 544) can be adjusted slightly by attaching them to the frame 502 and the rack 510 by use of paired nuts 546 to allow the position of the rack 510 in the frame 502 to be adjusted. In the embodiment illustrated, the first, second, and fourth lever arms (534, 536, 544) are located further inward from the periphery of the frame 502 than in the embodiment illustrated in FIG. 5, so as to improve access to the lever arms (534, 536, 544) when adjusting the nuts 546 and to allow the frame side faces 508 to reside in closer proximity to the rack side faces 522, as noted above.

Figure 7:
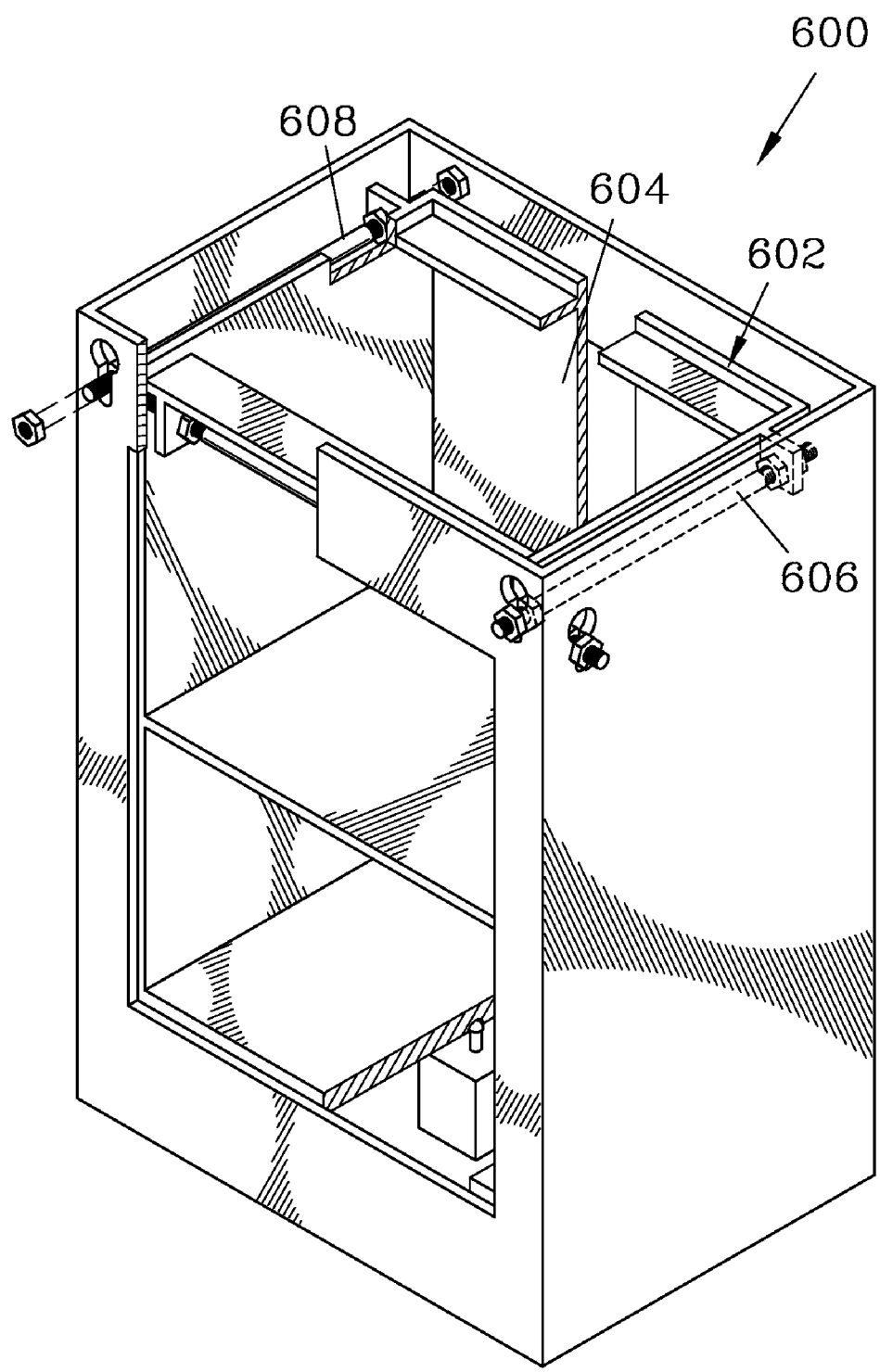
FIG. 7 is an isometric view of another embodiment of the present invention, which is similar to the embodiment shown in FIG. 4 but differs in that a back plate has been added to the rack to provide greater rigidity. The back plate causes the weight of the rack to be off-center with respect to a pivotal contact element, and the lever arms are connected between the rack and the frame such that the off-center weight maintains the first and second lever arms in tension when the frame is in service.

FIG. 7 is an isometric view of a shelving system 600 that is similar to the shelving system 300 shown in FIG. 4, but which has a rack 602 that is weighted by a back plate 604 to place a first lever arm 606 and a second lever arm 608 in tension.

Figures 8, 9:
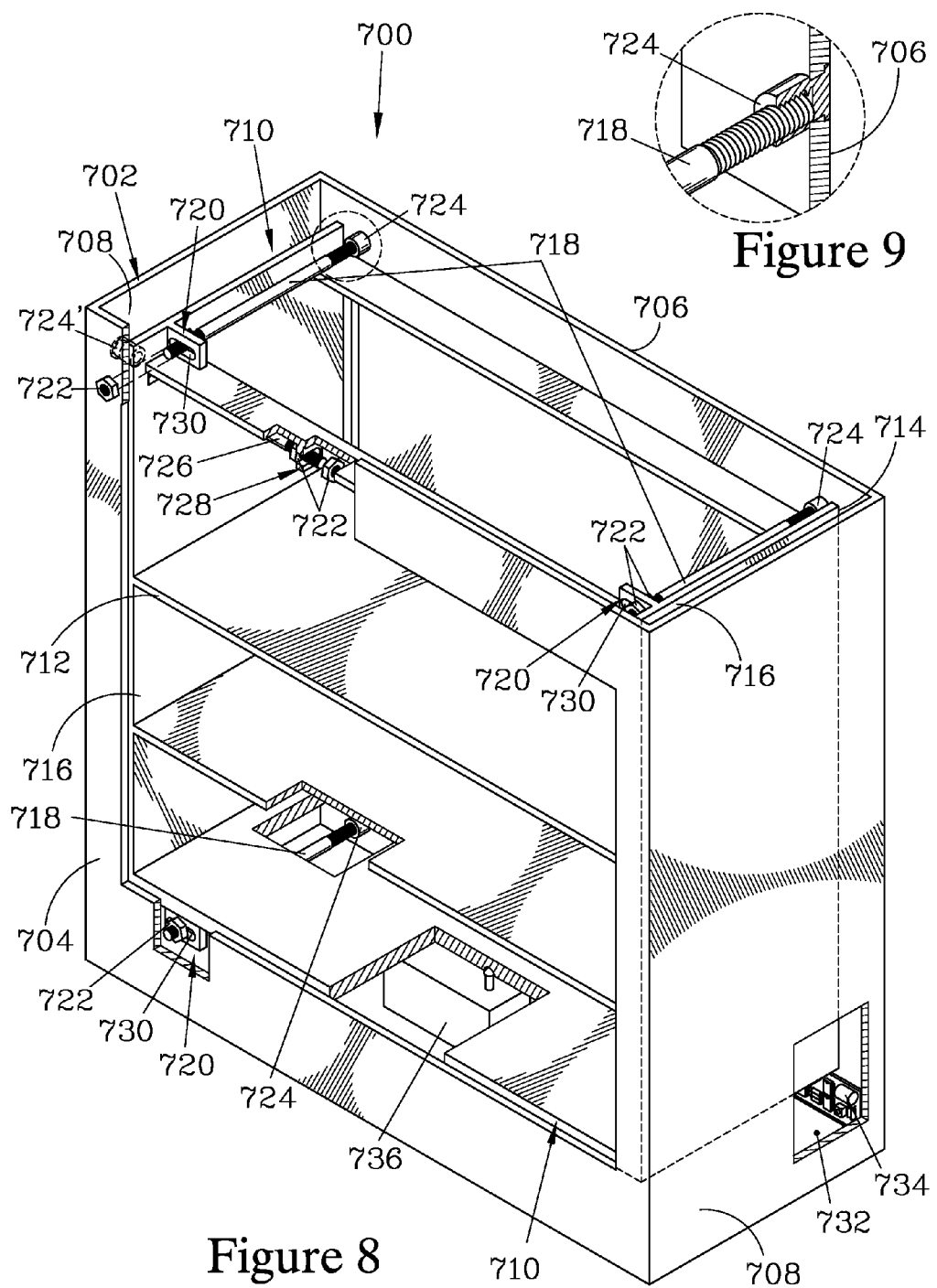
FIG. 8 is an isometric view of another embodiment which is similar to the embodiment shown in FIG. 6. However, this embodiment differs, in part, in that the lever arms are attached to the rear face of the frame. Also, the attachment of the lever arms to the rear face is accomplished by riveted fittings which enhance the appearance of the assembled shelving system. In this embodiment, substantially horizontal slots are employed to provide passages associated with the rack for securing the lever arms; these horizontal slots facilitating adjustment of the rack position in the frame. This embodiment also differs in that it houses electronic components that allow converting the output of the load cell into a signal compatible with weight monitoring systems, and communication ports for communicating signals to and from such a system. A section of a frame side face of the frame is broken away to show the location where electronic components for processing the load cell signal are housed.
FIG. 9 is a cross section of one of the riveted fittings used to secure one of the lever arms shown in FIG. 8.

FIG. 8 is an isometric view of another embodiment of the present invention, a shelving system 700 which is similar to the shelving system 500 of FIG. 6. The shelving system 700 has a frame 702 which is bounded by a frame front face 704, a frame rear face 706, and a pair of frame side faces 708. Residing within the frame 702 is a rack 710 which in turn is bounded by a rack front face 712, a rack rear face 714, and a pair of rack side faces 716. Again, there is an anti-sway system with four lever arms to stabilize the rack 710 within the frame 702. The anti-sway system has three lever arms 718 that extend substantially normal to the frame rear face 706 when in service. However, in this embodiment these three lever arms 718 are attached to the frame rear face 706 and to tabs 720 which in turn are attached to the rack 710 in close proximity to the rack front face 712, the lever arms 718 being attached to the tabs 720 by pairs of nuts 722. Attaching the lever arms 718 to the frame rear face 706 enhances the appearance of the shelving system 700 by providing an interruption-free frame front face 704. While the frame rear face 706 is not interruption-free, the visual continuity is substantially enhanced by employing riveted fittings 724 to secure the lever arms 718 to the frame 702 rather than pairs of bracketing nuts 546, as are employed to affix the lever arms (534, 536, and 544) to the frame 502 in the embodiment shown in FIG. 6. Furthermore, to reduce the visual interruption of the frame 702, another riveted fitting 724' can be employed to fasten a fourth lever arm 726 to one of the frame side faces 708, while a fourth tab 728 is provided on the rack 710 to secure the lever arm 726 to the rack 710. It is preferred that this riveted fitting 724' be embedded in the frame side face 708 which is less likely to be viewed by an observer when the shelving system 700 is in service. Since the lever arms (718, 726) are quasi-fixed with respect to the frame 702, it is preferred to employ horizontal slots 730 for passing the lever arms (718, 726) through the tabs (720 and 728), these slots 730 allowing for further adjustment in a horizontal direction of the rack 710 within the frame 702.

In FIG. 8, part of one of the frame side faces 708 is shown broken away to reveal the structure therebeneath. As shown, there is a cavity 732 which is located along the frame rear face 706. The cavity 732 is preferably positioned below the rack 710 to provide greater space. This cavity 732 is of a size sufficient to accommodate electronic components 734 that serve to convert the signal generated by a load cell 736 that supports the rack 710 into a signal which is readable as a weight or, in the alternative, readable in a format that is suitable for processing by an inventory monitoring system such as the system described in U.S. Publication 2005/0077352 A1. If one of the frame side faces 708 is made removable, such allows access to the electronic components 734 for repair or maintenance while the shelving system 700 remains in place. Alternatively, the electronic components 734 can be mounted to a removable panel that forms a portion of the frame rear face 706. The electronic components 734 preferably include one or more data communication ports, such as a RS-323 serial data port, to allow communication of the processed signal from the load cell 736 for use, such as to provide input to an inventory control system, as well as to allow inputting data to the load cell 736 and/or the converter circuitry, such as when calibrating the load cell 736 and/or the converter circuitry.

FIG. 9 is a cross section showing of one of the riveted fittings 724 that is embedded in the frame rear face 706, and illustrates how it helps maintain the continuity of the frame rear face 706. The riveted fitting 724 is inserted into a hole in the frame rear face 706 and then is peened level with the surface of the frame rear face 706 to secure the riveted fitting 724 in place.

While the novel features of the present invention have been described in terms of particular embodiments and preferred applications, it should be appreciated by one skilled in the art that substitution of materials and modification of details obviously can be made without departing from the spirit of the invention.

What is claimed is:

1. A shelving system for use with a load cell, the shelving system storing inventory while the load cell monitors the weight of inventory stored thereon, the shelving system comprising:

a frame having a frame height $H_F$ and terminating in a first pair of frame faces and being further bounded by a second pair of frame faces, said frame having a frame footprint and having a load cell support platform for attaching and supporting the load cell;

a rack having a rack height $H_R$ and terminating in a first pair of rack faces separated by a first rack face pair separation distance $D_1$ and further bounded by a second pair of rack faces separated by a second rack face pair separation distance $D_2$, said rack having a rack footprint which resides within said frame footprint, said rack having at least one shelf and a load cell proximity surface;

a pivotal contact element for interposing between said load cell proximity surface and the load cell; and an anti-sway and transient damping system having, a first lever arm affixed to said frame and to said rack at first lever arm connection points on said frame and said rack, said first lever arm connection points being spaced apart from each other by a first arm effective length $L_1$, a second lever arm affixed to said frame and to said rack at second lever arm connection points on said frame and said rack, said second lever arm connection points being spaced apart from each other by a second arm effective length $L_2$, said first and second lever arms being substantially parallel to each other and to said second pair of frame faces and being spaced apart from each other by an arm separation $S_A$, a third lever arm affixed to said frame and to said rack at third lever arm connection points on said frame and said rack, said third lever arm connection points being spaced apart from each other by a third arm effective length $L_3$, said third lever arm extending substantially normal to said first lever arm and said second lever arm, said first lever arm, said second lever arm, and said third lever arm being spaced apart with respect to said load cell proximity surface such that the closest of said lever arms resides at a substantial minimum vertical separation $S_V$ from said load cell proximity surface.

2. The shelving system of claim 1 further comprising:

a fourth lever arm affixed to said frame and to said rack at fourth lever arm connection points on said frame and said rack, said fourth lever arm connection points being spaced apart from each other by a fourth arm effective length $L_4$, said fourth lever arm being substantially parallel to at least one of said first lever arm, said second arm, and said third lever arm, said fourth lever arm being positioned in close proximity to a horizontal plane in which said load cell proximity surface resides.

3. The shelving system of claim 2 wherein the load cell is attached to said load cell support platform such that the attachment resides between said fourth lever arm and said pivotal contact element.

4. The shelving system of claim 2 wherein said fourth lever arm is substantially parallel to said first lever arm.

5. The shelving system of claim 4 wherein the load cell is attached to said load cell support platform such that the attachment resides between said fourth lever arm and said pivotal contact element.

6. The shelving system of claim 1 wherein said at least one shelf of said rack includes a lower shelf, further wherein said first, second, and third lever arms are located in close proximity to said lower shelf of said rack, said rack further comprising:
   an upper cross member residing in a top region of said frame, said load cell proximity surface being provided on said upper cross member.

7. The shelving system of claim 1 wherein said at least one shelf of said rack includes a lower shelf, further wherein said first, second, and third lever arms are substantially displaced from said lower shelf of said rack, and further wherein said load cell proximity surface resides below said lower shelf of said rack.

8. The shelving system of claim 2 wherein said at least one shelf of said rack includes a lower shelf, further wherein said first, second, and third lever arms are located in close proximity to said lower shelf of said rack, the rack further comprising:
   an upper cross member residing in a top region of said frame, said load cell proximity surface being provided on said upper cross member.

9. The shelving system of claim 2 wherein said at least one shelf of said rack includes a lower shelf, further wherein said first, second, and third lever arms are substantially displaced from said lower shelf of said rack, and further wherein said load cell proximity surface resides below said lower shelf of said rack.

10. The shelving system of claim 1 wherein said first lever arm, said second lever arm and said third lever arm are parallel to a common plane, and
    still further wherein said arm separation $S_A$ is greater than about ¾ of said second rack face pair separation distance $D_2$.

11. The shelving system of claim 10 wherein said minimum vertical separation $S_V$ is at least about ¾ of said rack height $H_R$.

12. The shelving system of claim 11 wherein said first arm effective length $L_1$, said second arm effective length $L_2$, and said third arm effective length $L_3$ are each at least about ½ of the minimum of said first rack face pair separation distance $D_1$ and said second rack face pair separation distance $D_2$.

13. The shelving system of claim 12 further comprising:
    a fourth lever arm affixed to said rack and to said frame at fourth lever arm connection points on said frame and said rack, said fourth lever arm connection points being spaced apart from each other by a fourth arm effective length $L_4$ that is at least about ½ of the minimum of said first rack face pair separation distance $D_1$ and said second rack face pair separation distance $D_2$,
    said fourth lever arm being substantially parallel to at least one of said first lever arm, said second arm and said third lever arm, said fourth lever arm being positioned in close proximity to a horizontal plane in which said load cell proximity surface resides.

14. The shelving system of claim 1 wherein said first pair of frame faces form a frame front face and a frame rear face of said frame, said frame front face having an opening to allow access to said rack.

15. The shelving system of claim 2 wherein said first pair of frame faces form a frame front face and a frame rear face of said frame, said frame front face having an opening to allow access to said rack.

16. The shelving system of claim 1 wherein all of said lever arms are cylindrical.

17. The shelving system of claim 2 wherein all of said lever arms are cylindrical.

18. The shelving system of claim 10 wherein all of said lever arms are cylindrical.

19. The shelving system of claim 11 wherein all of said lever arms are cylindrical.

20. The shelving system of claim 13 wherein all of said lever arms are cylindrical.

* * * * *